US008539442B2

(12) United States Patent
Moore

(10) Patent No.: US 8,539,442 B2
(45) Date of Patent: Sep. 17, 2013

(54) REVERSE ENGINEERING FOR CODE FILE REFACTORIZATION AND CONVERSION

(75) Inventor: Devin C. Moore, Lewis Center, OH (US)

(73) Assignee: Verizon Patent and Licensing Inc., Basking Ridge, NC (US)

( * ) Notice: Subject to any disclaimer, the term of this patent is extended or adjusted under 35 U.S.C. 154(b) by 964 days.

(21) Appl. No.: 12/574,383

(22) Filed: Oct. 6, 2009

(65) Prior Publication Data

US 2011/0083118 A1    Apr. 7, 2011

(51) Int. Cl.
*G06F 9/44*        (2006.01)
*G06Q 10/00*       (2012.01)

(52) U.S. Cl.
USPC ............................................ 717/110; 705/38

(58) Field of Classification Search
None
See application file for complete search history.

(56) References Cited

U.S. PATENT DOCUMENTS

2006/0155639 A1*  7/2006  Lynch et al. ................ 705/38
2008/0052684 A1*  2/2008  Bowdidge et al. ......... 717/136

* cited by examiner

*Primary Examiner* — Hyun Nam

(57) ABSTRACT

A system comprises a processing device, a data store selectively connected to the processing device and configured to store a plurality of segments of a software application, and a code refactoring application included on the processing device. The code refactoring application may include instructions that when executed cause the processing device to receive at least a subset of the segments of the software application from the data store, determine a design structure for the segments based at least in part on the received segments, and refactor the segments into a refactored segment according to the determined design structure.

24 Claims, 14 Drawing Sheets

REVERSE ENGINEERING FOR CODE FILE REFACTORIZATION AND CONVERSION

BACKGROUND

Some software applications grow according to changing requirements, without any particular design or plan. Other software applications are initially implemented according to a design, where the design is later compromised. In some instances, the design of a software application is compromised by later additions and features not initially contemplated. In other instances, the design of a software application is compromised through a lack of understanding by a maintenance programmer. In still other instances, introduction of new language features or code libraries may allow for a simpler implementation than was possible at the time at which a software application was originally designed or implemented.

Due to the complexity involved, continued maintenance of poorly designed software applications may be costly compared to maintenance of software applications with a clear design. Moreover, maintenance of such poorly designed software applications may cause undesirable side effects and problems due to unforeseen dependencies and issues. On the other hand, replacement of such software applications may also be costly and may introduce bugs or other issues into the software applications.

DETAILED DESCRIPTION

Technologies used to implement web applications have become more advanced. For example, technologies such as Java Server Pages (JSP), Active Server Pages (ASP), and eXtensible Server Pages (XSP) allow for the implementation of web applications that include dynamic content generated according to code functions in addition to static markup. Although these web applications may be relatively easy to implement, the resultant web applications may be developed as a set of code functions and static markup without any clear design.

Code refactoring is a process whereby the internal structure and/or computer code of a software application may be modified, without substantially affecting the external interface or functionality of the software application. An original software application may undergo code refactoring, such that the refactored application performs substantially the same operations as the original software application, but may be constructed internally according to an improved design. Refactoring may be performed through use of a specifically designed automated system configured to analyze and improve the design of the software application, while also minimizing the potential for undesired side effects caused by an unfocused code refactoring process.

More specifically, a code refactoring system may receive one or more segments of a software application, determine a common design structure for the segments including common static markup and common code functions, and refactor the static markup and code functions into a single refactored segment according to the determined design structure. This refactored segment of the web application may then be integrated back into the original web software application. Each of these steps is discussed in more detail in the figures below.

Figure 1:
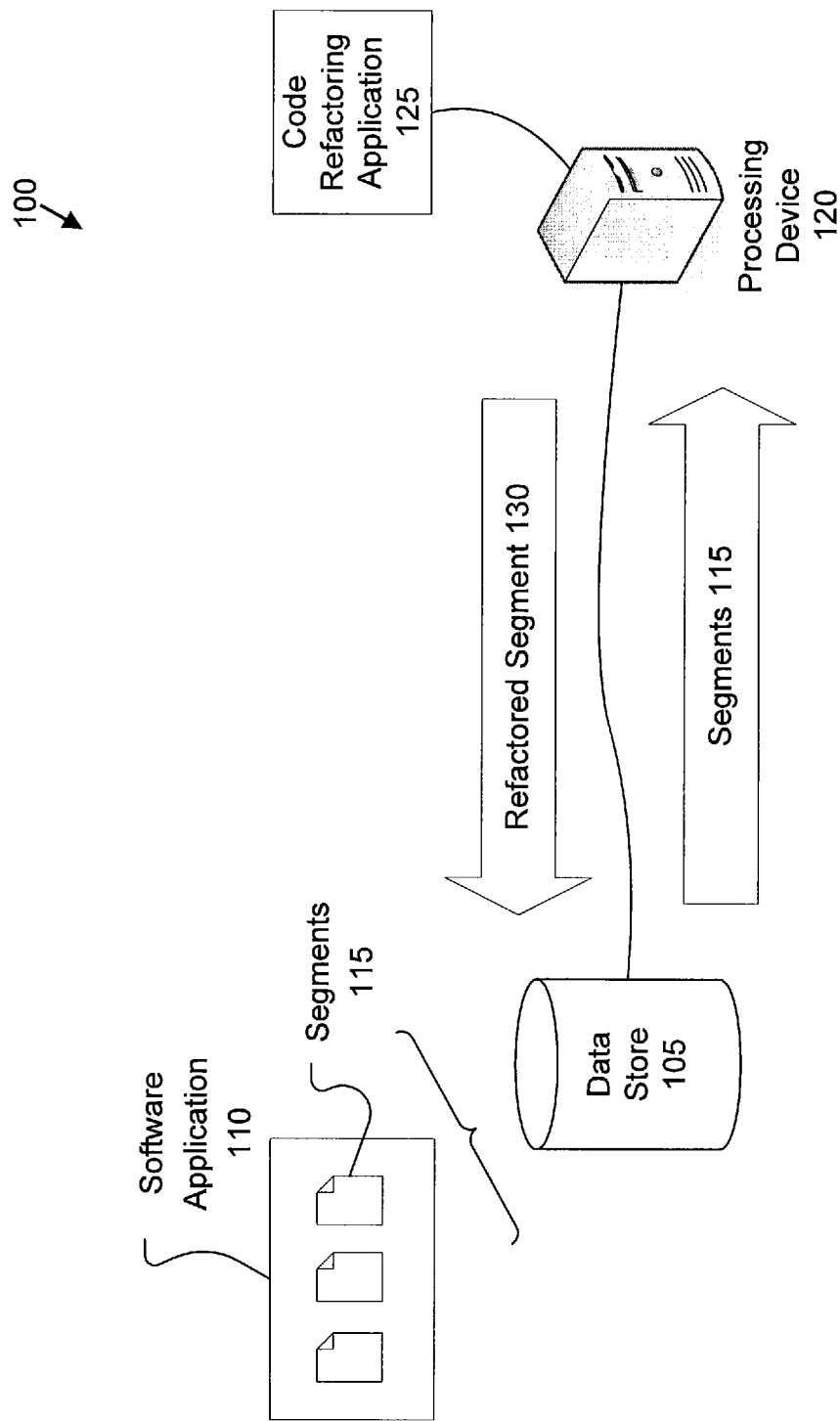
FIG. 1 illustrates an exemplary system for refactoring of segments of a software application.

FIG. 1 illustrates an exemplary system 100 for the refactoring of segments 115 of a software application 110. While an exemplary system 100 is shown in FIG. 1, the exemplary components illustrated in the figure are not intended to be limiting. Indeed, additional or alternative components and/or implementations may be used. System 100 may take many different forms and include multiple and/or alternate components and facilities.

As illustrated in FIG. 1, system 100 includes a data store 105 including a software application 110 made up of one or more segments 115. A processing device 120 may be in selective communication with the data store 105 and include a code refactoring application 125. The code refactoring application 125 may receive a set of segments 115 of a software application 110 to be refactored, and may refactor the segments 115 into a single refactored segment 130 with an improved design. The processing device 120 may further integrate the refactored segment 130 into the software application 110 in place of the segments 115.

The data store 105 may include one or more data storage mediums, devices, or configurations, and may employ various types, forms, and/or combinations of storage media, including but not limited to hard disk drives, flash drives, read-only memory, and random access memory. The data store 105 may include various technologies useful for storing and accessing any suitable type or form of electronic data, which may be referred to as content. Content may include computer-readable data in any form, including, but not limited to code listings, object code, video, image, text, document, audio, audiovisual, metadata, and other types of files or data. As an example, content may be stored in a relational format, such as via a relational database management system (RDBMS). As another example, content may be stored in a hierarchical or flat file system.

The data store 105 may store content that includes source code and/or object code for a software application 110, where the software application 110 may be configured to allow for a computing device to perform a specific task or tasks. By way of example, the data store 105 may store one or more hypertext markup language (HTML) files, Java server page (JSP) files, active server page (ASP) files, image files, cascading style sheet (CSS) files, and Java applet files that when combined implement a web-enabled software application 110. As another example, data store 105 may include one or more source code files that may be compiled by a source code compiler into object code files including executable instructions, where the object code files may then be executed by one or more computing devices. As yet another example, data store 105 may include one or more source files that may be interpreted by a code interpreter and accordingly executed by one or more computing devices.

The software application 110 may include one or more segments 115, where each segment 115 may include both markup for producing static sections of output and code functions for producing dynamic content. Each segment 115 may perform a specific subset of the tasks that may be performed by software application 110. For example, a software application may include a login page segment 115, an account statement page segment 115, and an account history page segment 115.

The code refactoring system 100 may further include a processing device 120 in selective communication with the data store 105. The processing device 120 may be implemented as a combination of hardware and software, and may include one or more software applications for causing one or more computer processors to perform the operations of the processing device 120 described herein.

A code refactoring application 125 may be one application included on the processing device 120, wherein the code refactoring application 125 may be implemented at least in part by instructions stored on one or more computer-readable media. The code refactoring application 125 may be written according to a number of different known programming technologies, or a combination thereof, such as the Java programming language, the C sharp programming language, C/C++, .NET, Fortran, Basic, JavaScript, Assembly, and Perl, among others.

The code refactoring application 125 may include instructions that when executed cause the processing device 120 to receive a set of segments 115 from a data store 105. The code refactoring application 125 may further include instructions that when executed cause the processing device 120 to combine the markup portions of the segments 115, refactor the markup portions of the segments 115, combine the code portions of the segments 115, refactor the code portions of the segments 115, and combine the refactored code and markup into a refactored segment 130. A refactored segment 130 may be a software segment that performs substantially the same operations as one or more original segments 115, but may be constructed internally according to an improved design. The processing device 120 may execute the instructions of the code refactoring application 125 to thereby cause the processing device 120 to perform a refactoring of one or more segments 115 into a refactored segment 130. Exemplary aspects of the refactoring performed by the code refactoring application 125 are discussed in detail below.

In general, computing systems and/or devices, such as processing device 120 and data store 105, may employ any of a number of well known computer operating systems, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Examples of computing devices include, without limitation, a computer workstation, a server, a desktop, notebook, laptop, or handheld computer, or some other known computing system and/or device.

A computer-readable medium (also referred to as a processor-readable medium) includes any tangible medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores, such as data store 105 described herein, may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.).

While FIG. 1 illustrates an exemplary system 100, other implementations may be used. In some implementations, additional elements may be included or elements shown in FIG. 1 may be omitted or modified. For example, data store 105 and processing device 120 may be combined in certain implementations. As another example, a system may include multiple data stores 105.

Figure 2:
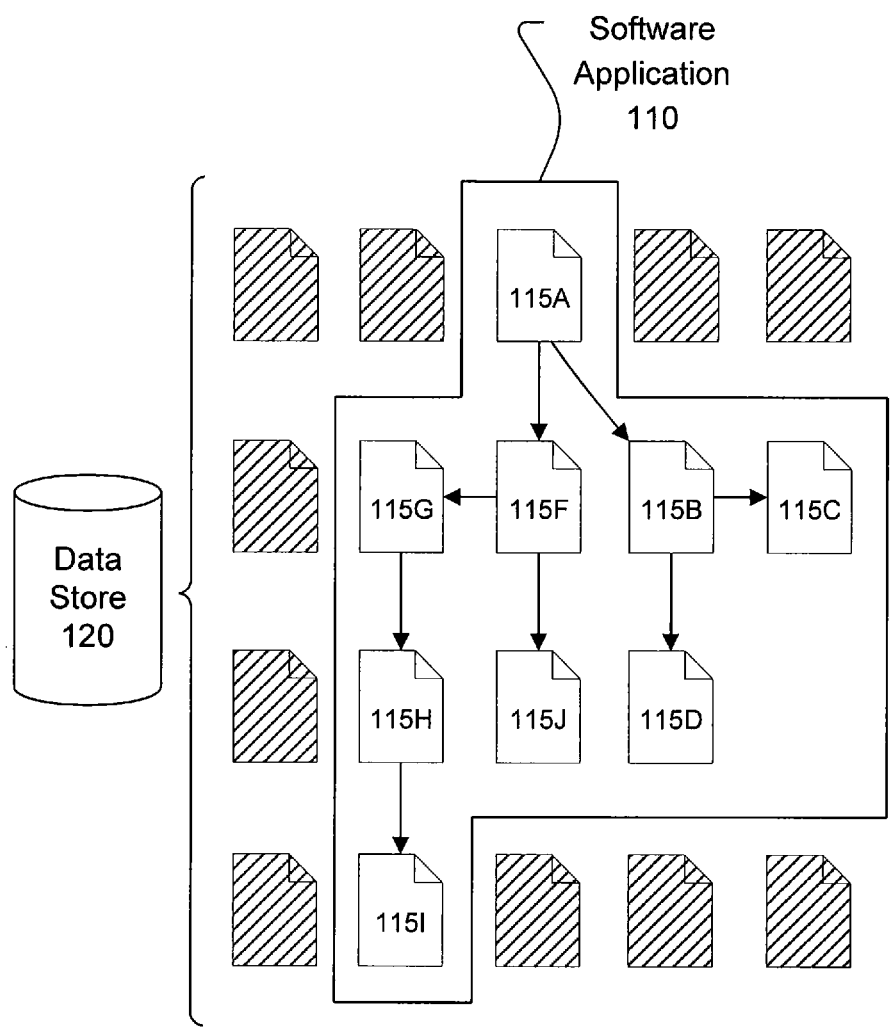
FIG. 2 illustrates further details of an exemplary software application stored in a data store.

FIG. 2 illustrates further details of an exemplary software application 110 stored in a data store 105. As mentioned above, the data store 105 may include a plurality of segments 115, and a software application 110 may include one or more of the stored segments 115. As illustrated, an exemplary plurality of included segments 115 are indicated as the segments 115A-J included within the software application 110. Additionally, the dashed segments 115 outside of the software application 110 indicate segments 115 that may be stored in the data store 105 but are not part of the software application 110. While the exemplary software application 110 is illustrated as including nine segments 115A-J, software applications 110 with more or fewer segments 115 are possible and likely.

At least a subset of the segments 115 of the software application 110 may be used as input to the code refactoring application 125. For example, an operator may indicate to the code refactoring application 125 that segments 115A, 115B and 115C are to be refactored into a refactored segment 130.

Alternately, the code refactoring application 125 may automatically determine which segments 115 to refactor. As an example, the code refactoring application 125 may determine which segments 115 to include by comparing each of the segments 115 to each of the other segments 115, and selecting a subset of the segments 115 that are the most similar for refactoring. For example, the code refactoring application 125 may determine that segments 115B, 115C, and 115D are similar in structure, and may therefore select these segments 115 for code refactoring.

Once a set of segments 115 are selected for code refactoring, the code refactoring application 125 may refactor the markup and the functions of the selected segments 115. Each of these portions of the refactoring are discussed in turn.

Figure 3:
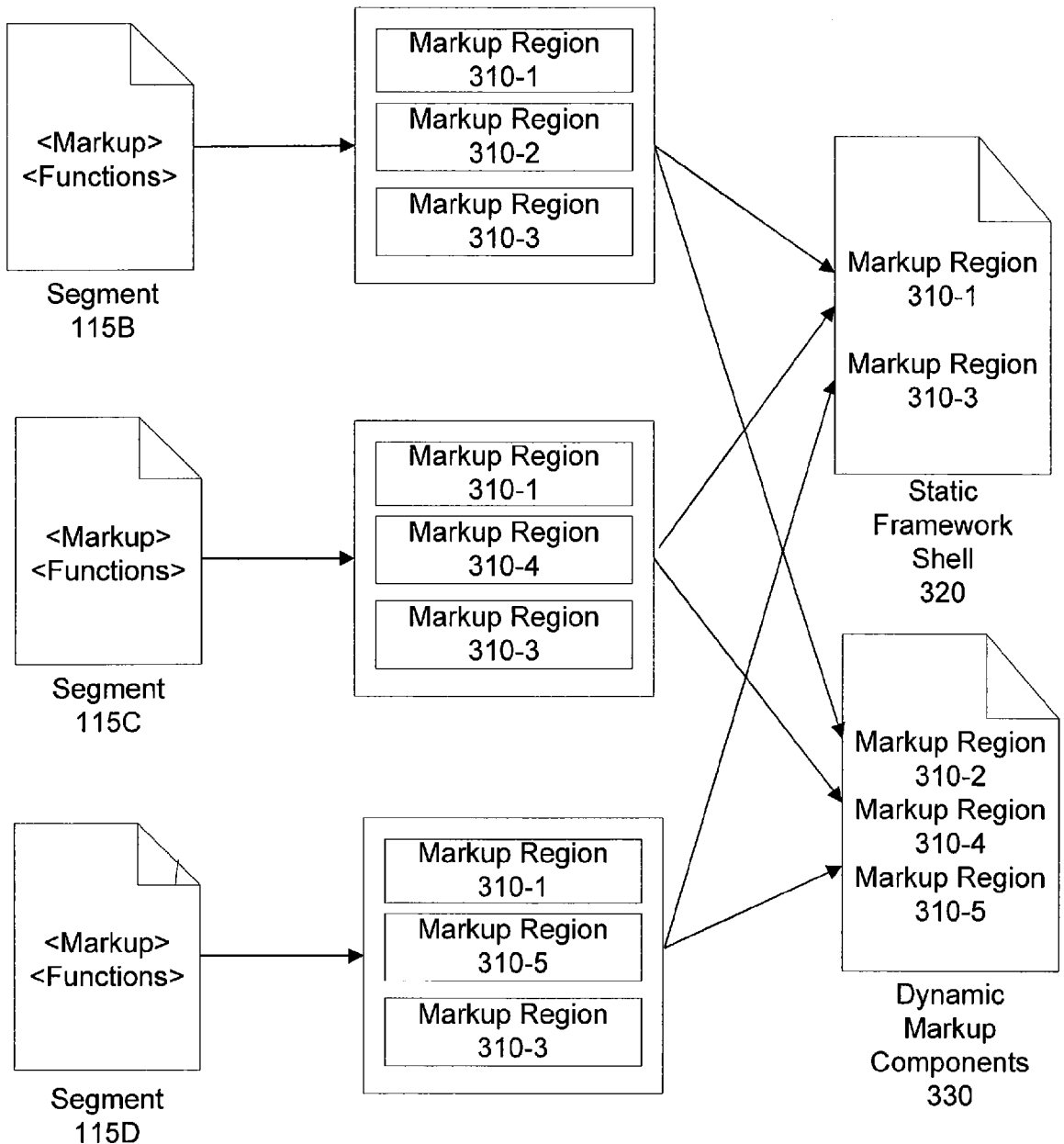
FIG. 3 illustrates an exemplary mapping of markup associated with a plurality of segments into a static framework shell and a set of dynamic markup components.

FIG. 3 illustrates an exemplary mapping of markup associated with a plurality of segments 115 into a static framework shell 320 and a set of dynamic markup components 330.

A markup region 310 may be a portion of the markup included in a segment 115. Alternately, a markup region 310 may be a portion of markup in an output generated by a segment 115 when executed by a computing device, such as when executed by processing device 120.

The code refactoring application 125 may determine one or more markup regions 310 associated with each segment 115, and may compare the markup regions 310 associated with each segment 115 with the markup regions 310 associated with each other segment 115. Based on the comparisons, the code refactoring application 125 may identify one or more markup regions 310 that the segments 115 have in common and/or one or more markup regions 310 of the segments 115 that differ. The code refactoring application 125 may use the identified markup regions 310 to construct a static framework shell 320 of the markup regions 310 that the segments 115 have in common. The code refactoring application 125 may further use the identified markup regions 310 to construct a set of dynamic markup components 330 including the differing markup regions 310 of the segments 115.

For example, the code refactoring application 125 may compare the segments 115 to one another using a textual or software comparison tool, such as through use of a UNIX system diff utility. As another example, the code refactoring application 125 may cause the processing device 120 to execute each of the segments 115 being compared, retrieve output markup generated by the segments 115, and compare the resultant outputs. It should be noted that in some instances, a segment 115 may potentially produce multiple outputs with varying markup regions 310 based on one or more input parameters that may be forwarded to the segment 115. In such instances, the code refactoring application 125 may consider multiple outputs of the segment 115 in determining the various markup regions 310.

As illustrated in FIG. 3, the code refactoring application 125 may compare markup regions 310 associated with each of the segments 115B, 115C, and 115D with markup regions 310 associated with each of the other segments 115B, 115C, and 115D. For example, the code refactoring application 125 may compare segments 115B, 115C, and 115D with one another. The code refactoring application 125 may determine that segment 115B includes markup regions 310-1 and 310-3 in common with segments 115C and 115D, but a differing markup region 310-2. Segment 115C may likewise be determined to include markup regions 310-1 and 310-3, but instead of markup region 310-2, segment 115C may include a different central markup region 310-4. Segment 115D may also be determined to include markup regions 310-1 and 310-3 as well, but instead of markup region 310-2 or markup region 310-4, segment 115D may be determined to include a markup region 310-5.

Accordingly, markup regions 310-1 and 310-3 may be included in a static framework shell 320. Additionally, markup regions 310-2, 310-4, and 310-5 may be included in a set of dynamic markup components 330.

Figure 4:
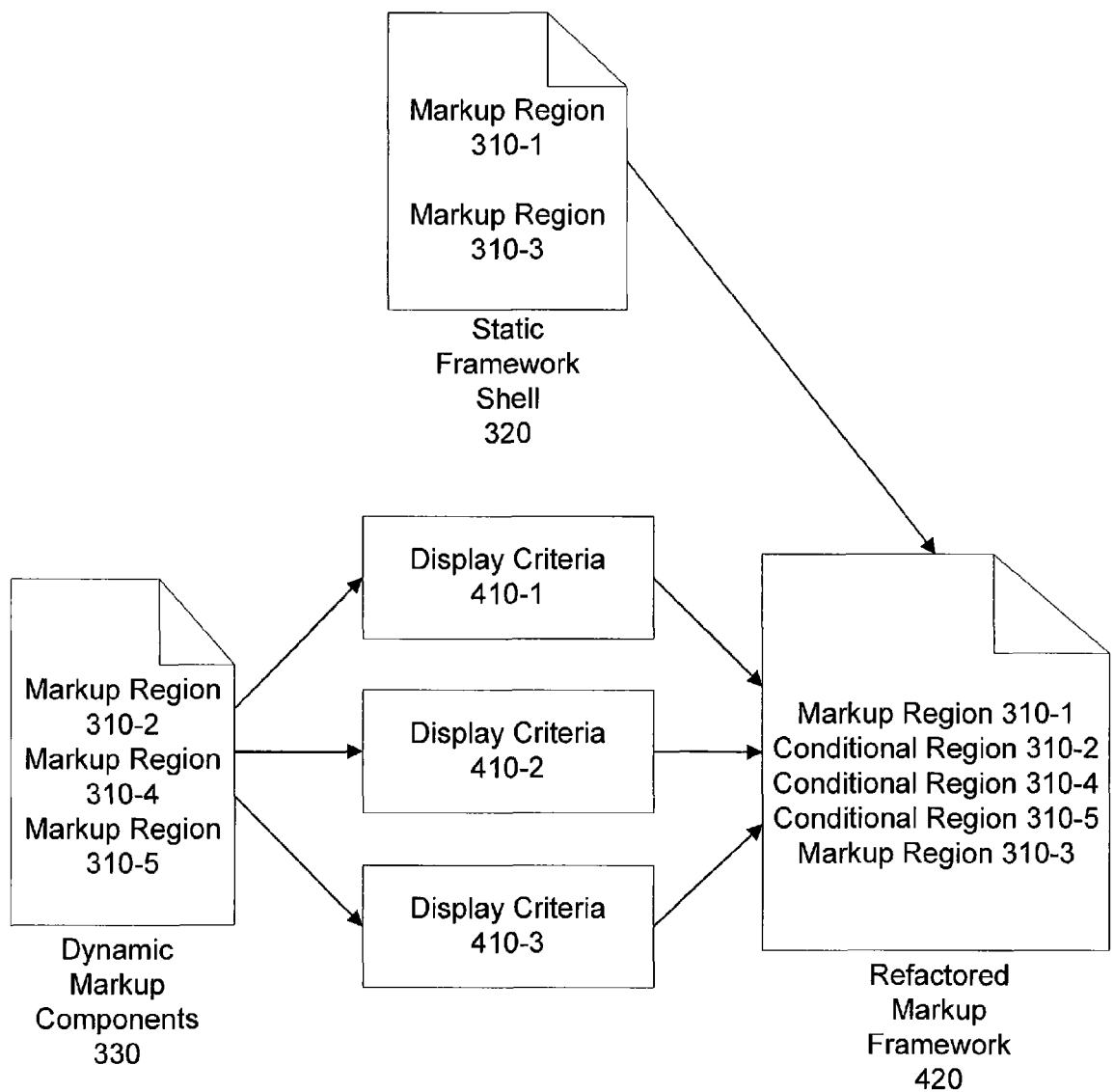
FIG. 4 illustrates an exemplary compilation of a refactored markup framework, incorporating a set of dynamic markup components into a static framework shell using display criteria.

FIG. 4 illustrates an exemplary compilation of a refactored markup framework 420, incorporating a set of dynamic markup components 330 into a static framework shell 320 using a display criteria 410. Once the static framework shell 320 and dynamic markup components 330 are determined, the code refactoring application 125 may create a refactored markup framework 420 that may be used in place of the markup of each of the segments 115 being refactored.

Display criteria 410 may include a set of flags or conditional expressions that selectively allow for the inclusion of each of the identified markup regions 310 to be included in the output. A refactored markup framework 420 may include both the identified static markup regions 310 included in a static framework shell 320 and also a set of display criteria 410. When the display criteria 410 are satisfied, the refactored markup framework 420 may selectively include the requisite dynamic markup components 330 into a generated markup. Accordingly, through selective use of the set of display criteria 410, the refactored markup framework 420 may be used to generate each of the resultant markups of each of the segments 115.

For example, continuing with the present example, the set of dynamic markup components 330 includes a markup region 310-2, a markup region 310-4, and a markup region 310-5. Each of these markup regions may be selectively included into an output markup that may be generated by the refactored markup framework 420. To allow for the selective inclusion of each of the markup regions 310, the refactored markup framework 420 may accept a set of display criteria 410-1 flag for the inclusion of markup region 310-2 in an output markup, a second set of display criteria 410-2 for the inclusion of markup region 310-4 in an output markup, and a third set of display criteria 410-3 for the inclusion of markup region 310-5 in an output markup.

Accordingly, the refactored markup framework 420 may allow for the construction of each of the markups of the segments 115 based on the set of display criteria 410. For example, the markup of segment 115C may be generated through the selective inclusion of conditional region 310-4.

In addition to the refactoring of the markup of the selected segment 115, the code refactoring application 125 may refactor the functions of the selected segments 115.

Figure 5:
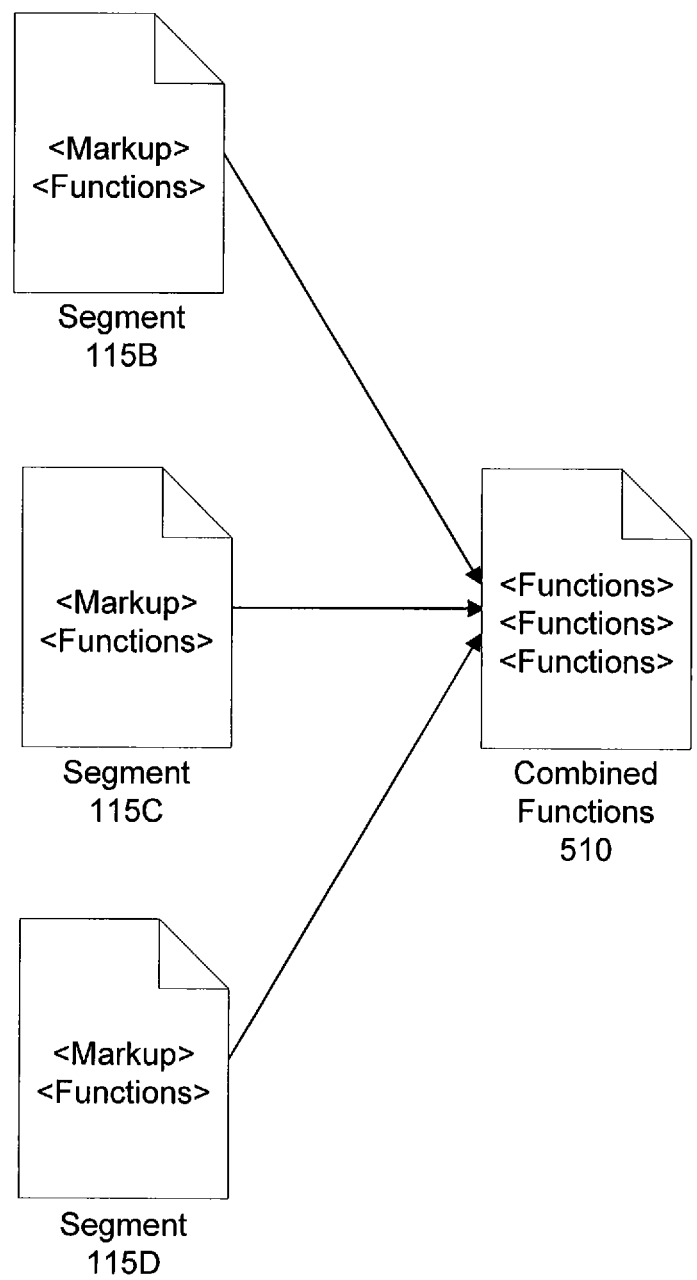
FIG. 5 illustrates an exemplary compilation of functions from a plurality of segments into a set of combined functions.

FIG. 5 illustrates an exemplary compilation of functions from a plurality of segments 115 into a set of combined functions 510. The code refactoring application 125 may search for code functions through each of the segments 115 to be refactored into a refactored segment 130. These collected functions may be combined into a set of combined functions 510.

For example, the code refactoring application 125 may search through segments 115B, 115C, and 115D, and may collect substantially all of the located code functions. These collected functions may accordingly be combined into a set of combined functions 510, which may then be refactored by the code refactoring application 125.

Figure 6:
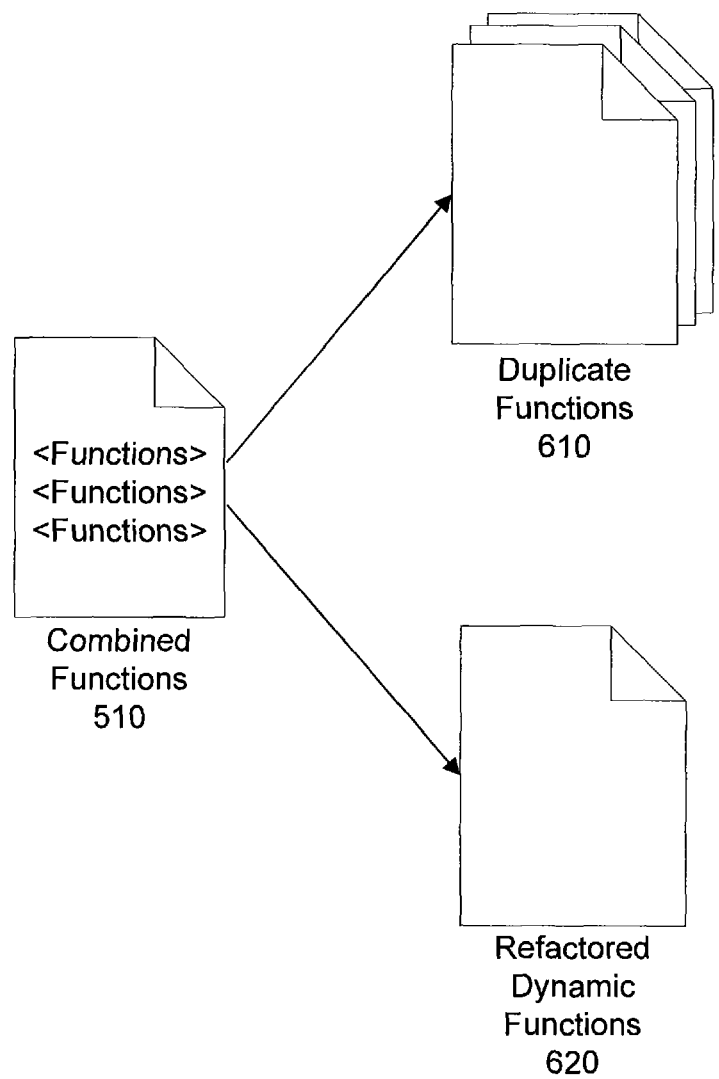
FIG. 6 illustrates an exemplary refactoring of combined functions including into refactored dynamic functions and duplicate functions.

FIG. 6 illustrates an exemplary refactoring of combined functions 510 into refactored dynamic functions 620 and duplicate functionality 610. Through analysis of the combined functions 510, the code refactoring application 125 may combine and/or remove similar functions, loops, and methods. These instances of refactoring may be performed, for example, to reduce operational overhead while producing the same set of dynamic data. As an example, a set of functions that each retrieves the same data from a data source may be combined. Further exemplary instances of refactoring of the code may include removal of duplicate functions, loop optimization, and methods abstraction.

Figure 7:
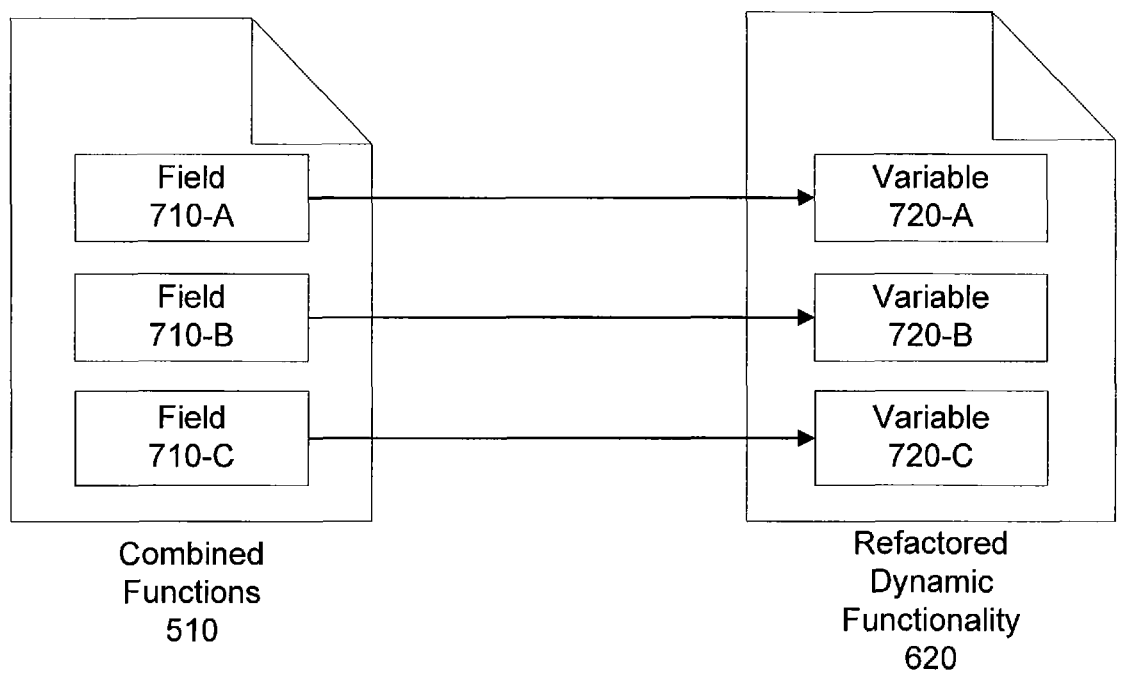
FIG. 7 illustrates an exemplary refactoring of dynamic functions into refactored dynamic functions including variable mapping.

FIG. 7 illustrates an exemplary refactoring of combined functions 510 into refactored dynamic functions 620 including variable mapping.

A refactored markup framework 420 may include one or more fields 710 into which a user may enter input to the software application 110. These fields 710 may be referenced in the code portions of the combined functions 510. For instance, the combined functions 510 may validate that the input into the fields 710 conforms with formatting rules for the particular type of data being entered. As an example, a username field may be validated by a function in the combined functions 510 to ensure that an entered username is of a proper length. As another example, a telephone number field may be validated by a function in the combined functions 510 against a dialing plan to ensure that the entered telephone number is valid.

To access the data included within the fields 710, variables 720 associated with the fields 710 of the refactored markup framework 420 may be defined within the combined functions 510. These variables 720 may accordingly be used to set and retrieve values of the fields 710.

Due to the combination of multiple segments 115 into the refactored markup framework 420, one or more fields 710 of the refactored markup framework 420 may be mapped to multiple variables 720. Alternately, one or more fields of the refactored markup framework 420 may be referenced by the combined functions 510, but may not be associated with any mapped variables 720. To remedy these issues, one or variables 720 may be selectively created in or removed from the combined functions 510. In some example, the variables 720 may further be renamed using a naming scene such that each variable 720 has a unique or logical name.

For example, a refactored framework may include three fields 710, e.g. field 710-A, field 710-B, and field 710-C. The code refactoring application 125 may create a set of variables 720 to allow for each of the fields field 710-A, field 710-B, and field 710-C to be accessible. Variable 720-A may be defined and associated with the field 710-A. Variable 720-B may be defined and associated with the field 710-B. Variable 720-C may be defined and associated with the fields 710-C.

The code refactoring application 125 may further remove any duplicate variables 720 for the fields 710-A, 710-B, and 710-C. Any instances in the combined functions 510 that reference the removed variables may be updated to utilize the newly added variables 720.

Accordingly, combined functions 510 may be refactored into refactored dynamic functions 620 using variable 720 definitions.

Figure 8:
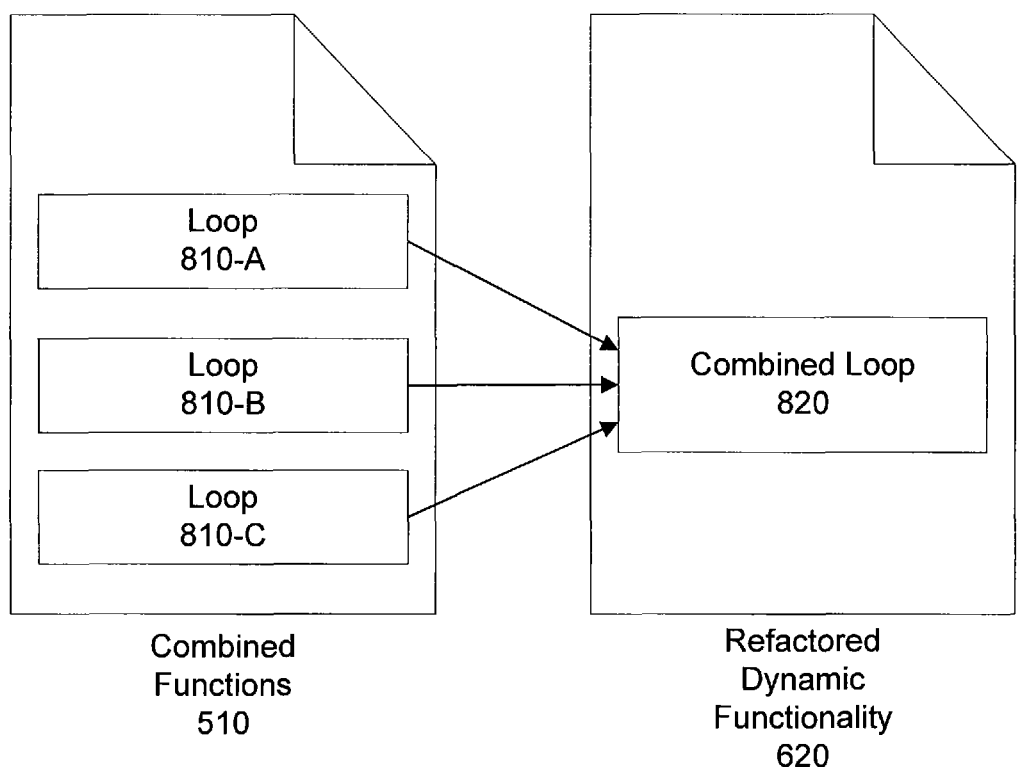
FIG. 8 illustrates an exemplary refactoring of dynamic functions into refactored dynamic functions including loop optimization.

FIG. 8 illustrates an exemplary refactoring of combined functions 510 into refactored dynamic functions 620 including loop optimization.

A loop 810 may be a code construct defined to allow for a section of code to be repeated until a particular condition is satisfied, such as a variable being equal to a particular value or until each data element in a data structure is iterated over. The combined functions 510 may include one or more loop 810 constructs. The code refactoring application 125 may identify loops 810 that may be combined, such as loops 810 that repeat until the same particular condition is satisfied or over the same data. These loops 810 may be combined into a combined loop 820 that performs each of the operations of the original loops, but that performs the looping once, rather than multiple times. Looping once rather than multiple times may save processing time, and may speed up the execution of the combined functions 510. Accordingly, combined functions 510 may be refactored into refactored dynamic functions 620 through loop optimization.

For example, a refactored framework may include three loops 810, e.g. loop 810-A, loop 810-B, and loop 810-C. The code refactoring application 125 may determine that each of loops 810-A, 810-B, and 810-C iterate over substantially the same set of data. Accordingly the code refactoring application 125 combine loops 810-A, 810-B, and 810-C into a single combined loop 820.

Figure 9:
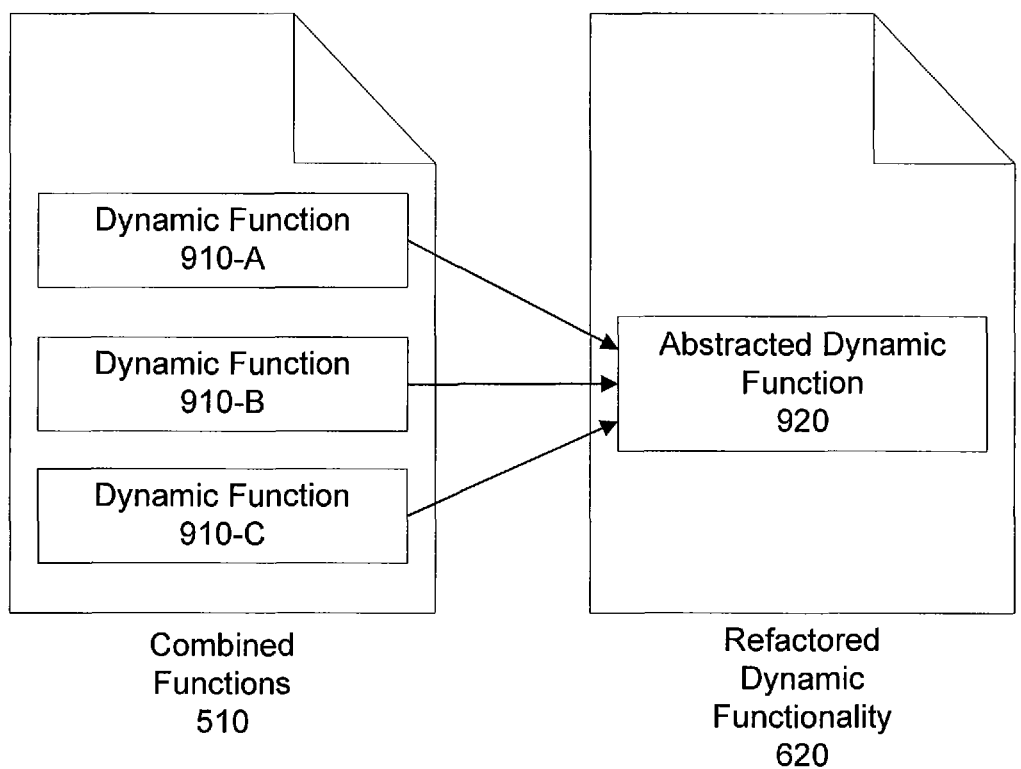
FIG. 9 illustrates an exemplary refactoring of dynamic functions into refactored dynamic functions including function abstraction.

FIG. 9 illustrates an exemplary refactoring of combined functions 510 into refactored dynamic functions 620 including function abstraction.

In some instances, combined functions 510 may include repeated sections of similar or identical code. These similar or identical sections of code may be referred to as dynamic functions 910. Multiple dynamic functions 910 may be combined into an abstracted dynamic function 920, where the single abstracted dynamic functions 920 may replace each of the similar or identical dynamic functions 910. For example, a new function may be created including the section of similar or identical code, and each former instance of the code may be replaced by a function call to the newly created function. This process may be referred to as function abstraction.

The code refactoring application 125 may identify dynamic functions 910 for function abstraction according to various heuristics. For example, the code refactoring application 125 may determine a section of similar or identical code to be a candidate for function abstraction according to a number of lines heuristic, wherein the section of code must meet or exceed the number of lines defined by the number of lines heuristic. As another example, the code refactoring application 125 may determine a section of similar or identical code to be a candidate for function abstraction according to a number of repetitions heuristic, wherein the section of code must be included at least the number of times defined by the number of repetitions heuristic.

Additionally or alternately, the code refactoring application 125 may determine a section of similar or identical code to be a candidate for function abstraction according to ability of a section of code to be parameterized based on its usage in the combined functions 510. For example, if multiple sections of code perform identical operations on different variables, the multiple sections of code may be combined into a function that takes as an input a particular variable with which to interact.

If a section of code is determined to be a good candidate for function abstraction, then a new function may be created including the corresponding section of code to be abstracted. Each instance of the abstracted section of code may accordingly be replaced by a call to the newly created function, rather than the repetition of the corresponding section of code. In some examples, the new function may be parameterized to be called with one or more parameters, where the parameters may be passed to the abstracted function based on its usage in the combined functions 510.

Figure 10:
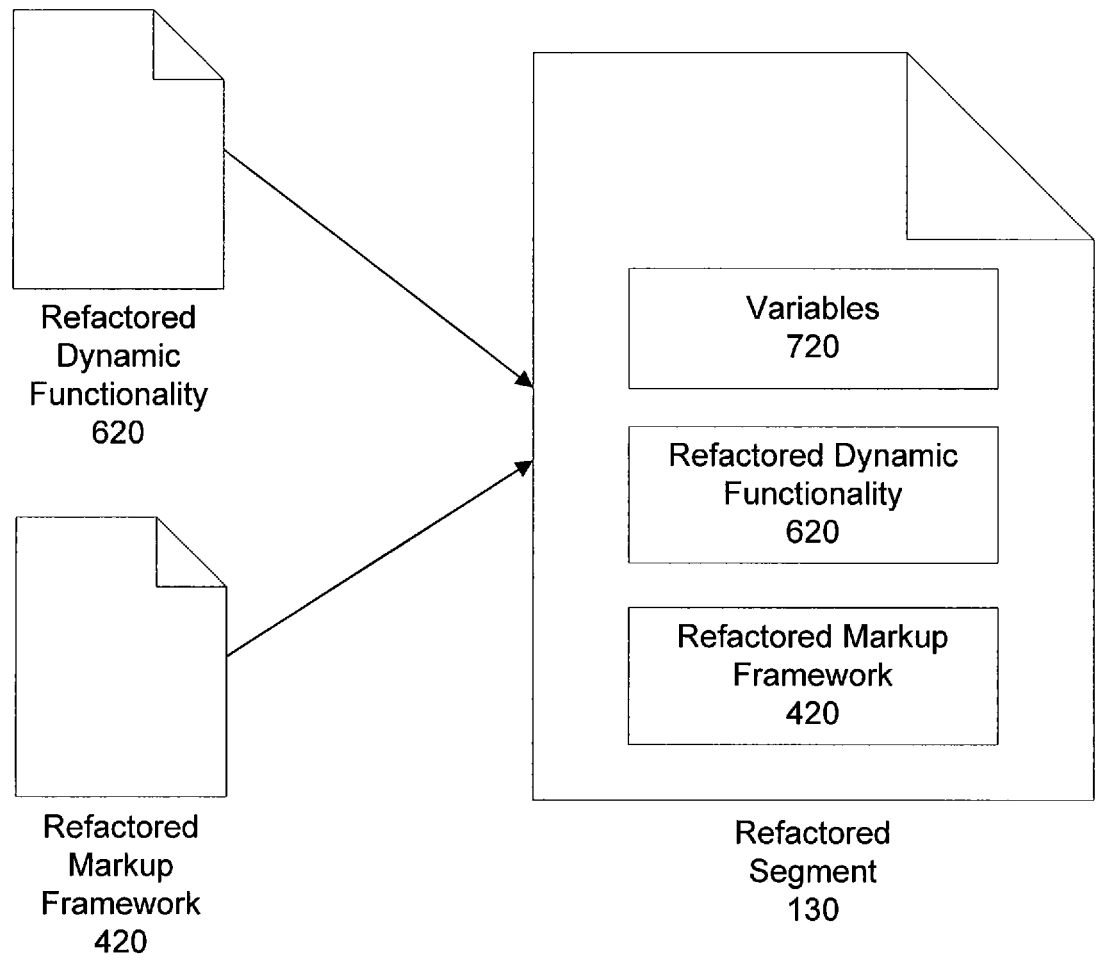
FIG. 10 illustrates an exemplary compilation of a refactored segment.

FIG. 10 illustrates an exemplary completion of a refactored segment 130 for inclusion in a software application 110. As illustrated, the refactored segment 130 may be completed based on the refactored dynamic functions 620 and the refactored markup framework 420.

Specifically, the code refactoring application 125 may arrange the refactored dynamic functions 620 and the refactored markup framework 420 to create a refactored segment 130 such that the resultant refactored segment 130 may produce substantially the same output as the multiple segments 115 used to create the refactored segment 130.

For example, the refactored segment 130 may include variable 720 declarations, local function definitions from the refactored dynamic functions 620, a page rendering function based on the refactored markup framework 420, and variable 720 and function cleanup. In some instances, the refactored segment 130 may include a page rendering function surrounded by a try-catch block to handle any potential error conditions. The refactored segment 130 may further include code to retrieve request or session parameters for the page rendering functions that may be used to determine which conditional regions 310 to include in the output markup, one or more function calls to page rendering functions in an appropriate order according to the request or session parameters, and code to display the output markup in order.

Figure 11:
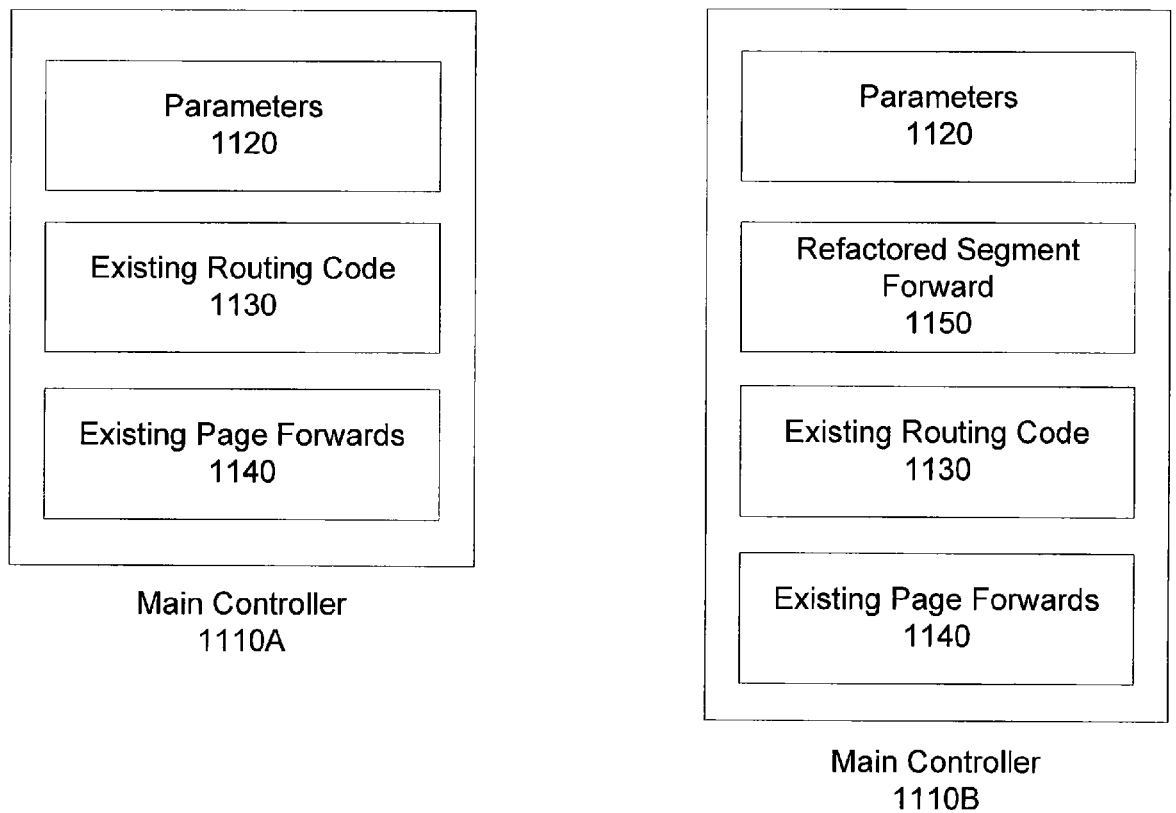
FIG. 11 illustrates an exemplary main controller into which a forward to a refactored segment may be inserted.

FIG. 11 illustrates an exemplary main controller 1110 into which a forward to a refactored segment 130 may be inserted. As illustrated, a main controller 1110A for one or more segments 115 may be modified into a main controller 1110B that forwards to a refactored segment 130 rather than to the one or more segments 115 being refactored.

A software application 110 may include a main controller 1110. The main controller 1210 may be used as a core of the software application 110, and may accordingly control some or substantially all interactions within the software application 110. In some instances, received data may be sent to the main controller 1110. The main controller 1110 may then send the received data as parameters 1120 to an appropriate segment 115 of the software application 110 to be processed. Data may be sent to the appropriate segment 115 through use of existing routing code 1130 and existing page forwards 1140. The result may then be sent back to the main controller 1110, which may then forward to a second segment 115 that may, for example, produce an output for display.

The code refactoring application 125 may identify a location in the main controller 1110 where the parameters 1120 necessary for the execution of the refactored segment 130 have been collected. At substantially this point in the main controller 1110, the code refactoring application 125 may insert a refactored segment forward 1150 to the refactored segment 130. Additionally, the code refactoring application 125 may insert a conditional to block the execution of a portion of the main controller 1110 formerly responsible for the existing routing code 1130 and existing page forwards 1140 for the segments 115 that are refactored into refactored segment 130.

Continuing with the present example, a software application 110 may include a main controller 1110A that controls the interactions within the software application 110. The code refactoring application 125 may identify a location in the main controller 1110A at which to insert a refactored segment forward 1150 to the refactored segment 130, and may accordingly modify the main controller 1110A into a main controller 1110B by the inclusion of a refactored segment forward 1150 to refactored segment 130. The code refactoring application 125 may further block the execution of existing routing code 1130 and existing page forwards 1140 for the segments 115.

Figure 12:
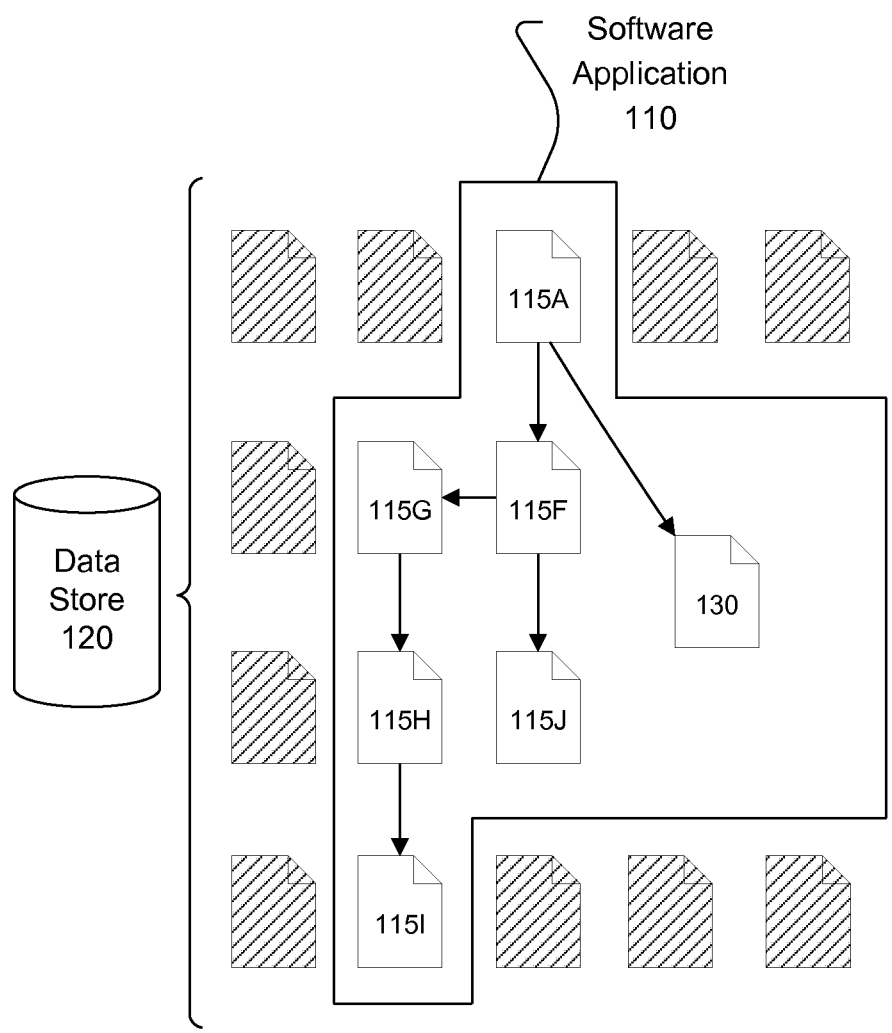
FIG. 12 illustrates an exemplary software application stored in a data store and including a refactored segment integrated into the software application.

FIG. 12 illustrates an exemplary software application 110 stored in a data store 105 and including a refactored segment 130 integrated into the software application 110. As illustrated, segments 115B, 115C, and 115D are replaced by a refactored segment 130.

Accordingly, the code refactoring application 125 may therefore replace the one or more segments 115 by a refactored segment 130. As a result, the code refactoring application 125 may improve the design of the software application 110.

In some examples, the original files for segments that have been refactored may be removed from the data store 105. However it should be noted that in other examples, segments 115B, 115C, and 115D may remain in the data store 105, because these segments 115 they may still be utilized by other portions of one or more software applications 110.

Figure 13:
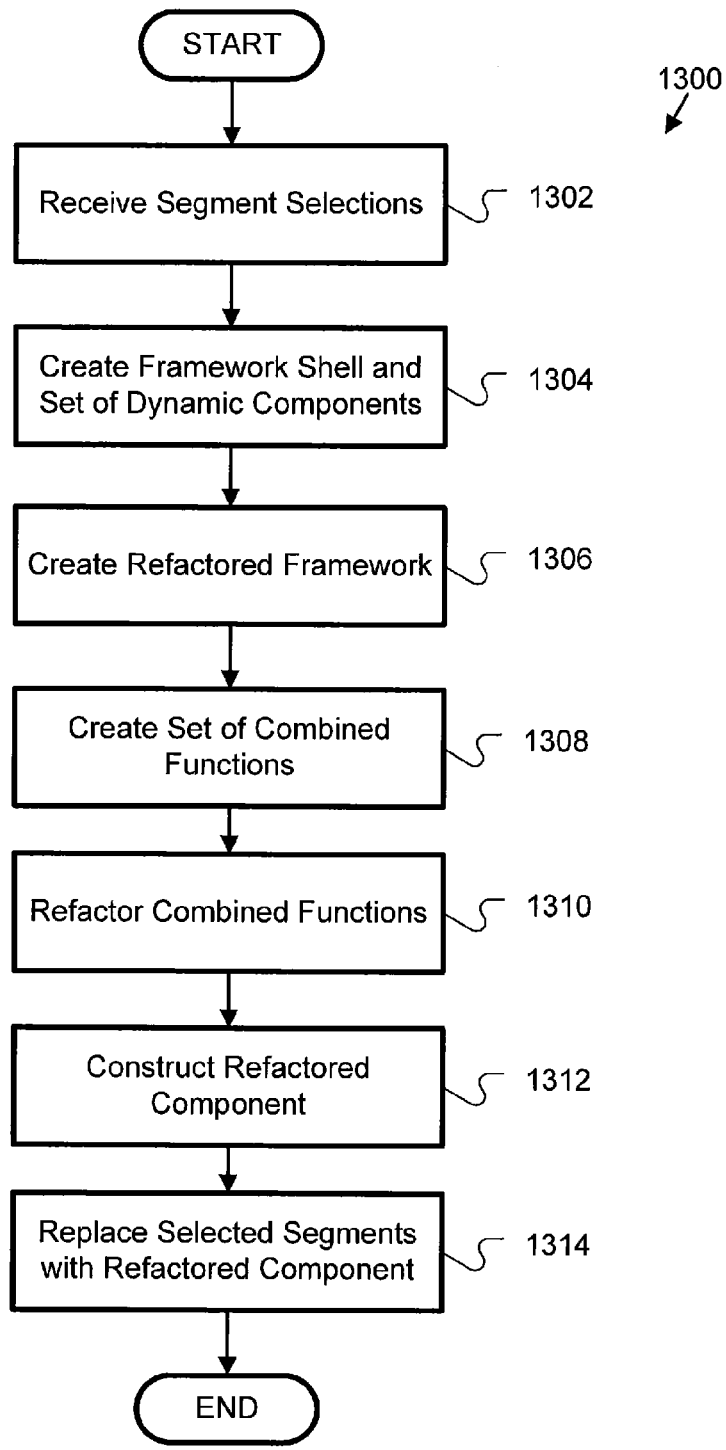
FIG. 13 illustrates an exemplary process flow for refactoring of segments of a software application.

FIG. 13 illustrates an exemplary process flow 1300 for refactoring of segments 115 of a software application 110.

In block 1302, the code refactoring application 125 receives segment 115 selections to be refactored into a refactored segment 130. For example, an operator of the code refactoring application 125 may select one or more segments 115 for refactoring. As another example, the code refactoring application 125 may determine which segments 115 to include by comparing each of the segments 115 to each of the other segments 115, and selecting a subset of the segments 115 that are the most similar for refactoring into a refactored segment 130.

In block 1304, the code refactoring application 125 creates a static framework shell 320 and a set of dynamic markup components 330 from the received segments 115. For example, the code refactoring application 125 may execute and compare the output of each of the segments 115 with the output of each of the other segments 115. As another example, the code refactoring application 125 may compare the markup of the segments 115 directly. Based on these comparisons, regions 310 of the output of the segments 115 that differ or are in common among the segments 115 may be identified. These identified regions 310 of difference or similarity may be identified and labeled. The static framework shell 320 may include the substantially static components of the outputs of the segments 115, and the set of dynamic markup components 330 may include the dynamic components of the markup portions of the outputs of the segments 115 being refactored.

In block 1306, the code refactoring application 125 creates a refactored markup framework 420 based on the static framework shell 320 and the set of dynamic markup components 330. For example, the code refactoring application 125 may create a refactored markup framework 420 that includes both the identified static markup regions 310 included in a static framework shell 320 and also a set of display criteria 410 that when satisfied selectively include the requisite dynamic markup components 330 into an output generated by the refactored markup framework 420.

In block 1308, the code refactoring application 125 creates a set of combined functions 510 from the received segments 115. For example, the code refactoring application 125 may search through the received segments 115, and may collect substantially all of the located code functions. These collected functions may accordingly be combined into a set of combined functions 510.

In block 1310, the code refactoring application 125 refactors the combined functions 510. For example, the code refactoring application 125 may refactor the combined functions 510 into refactored dynamic functions 620. Exemplary refactorizations of the combined functions 510 include variable mapping, loop optimization, and function abstraction. An exemplary process for function abstraction is discussed in more detail in process 1400 illustrated in FIG. 14.

In block 1312, the code refactoring application 125 constructs a refactored segment 130. For example, the code refactoring application 125 may arrange the refactored dynamic functions 620 and the refactored markup framework 420 to create a refactored segment 130 such that the resultant refactored segment 130 may produce substantially the same output as the multiple segments 115 selected for refactoring.

In block 1314, the code refactoring application 125 replaces the selected segments 115 with the refactored component 130. For example, the code refactoring application 125 may identify a location in the main controller 1210 where the parameters 1220 necessary for the execution of the refactored segment 130 have been collected. At substantially this identified point in the main controller 1210, the code refactoring application 125 may insert a refactored segment forward 1150, and also a conditional to block the execution of a portion of the main controller 1210 formerly responsible for the existing routing code 1230 and existing page forwards 1240 for the refactored segments 115. Next, the process 1300 ends.

Figure 14:
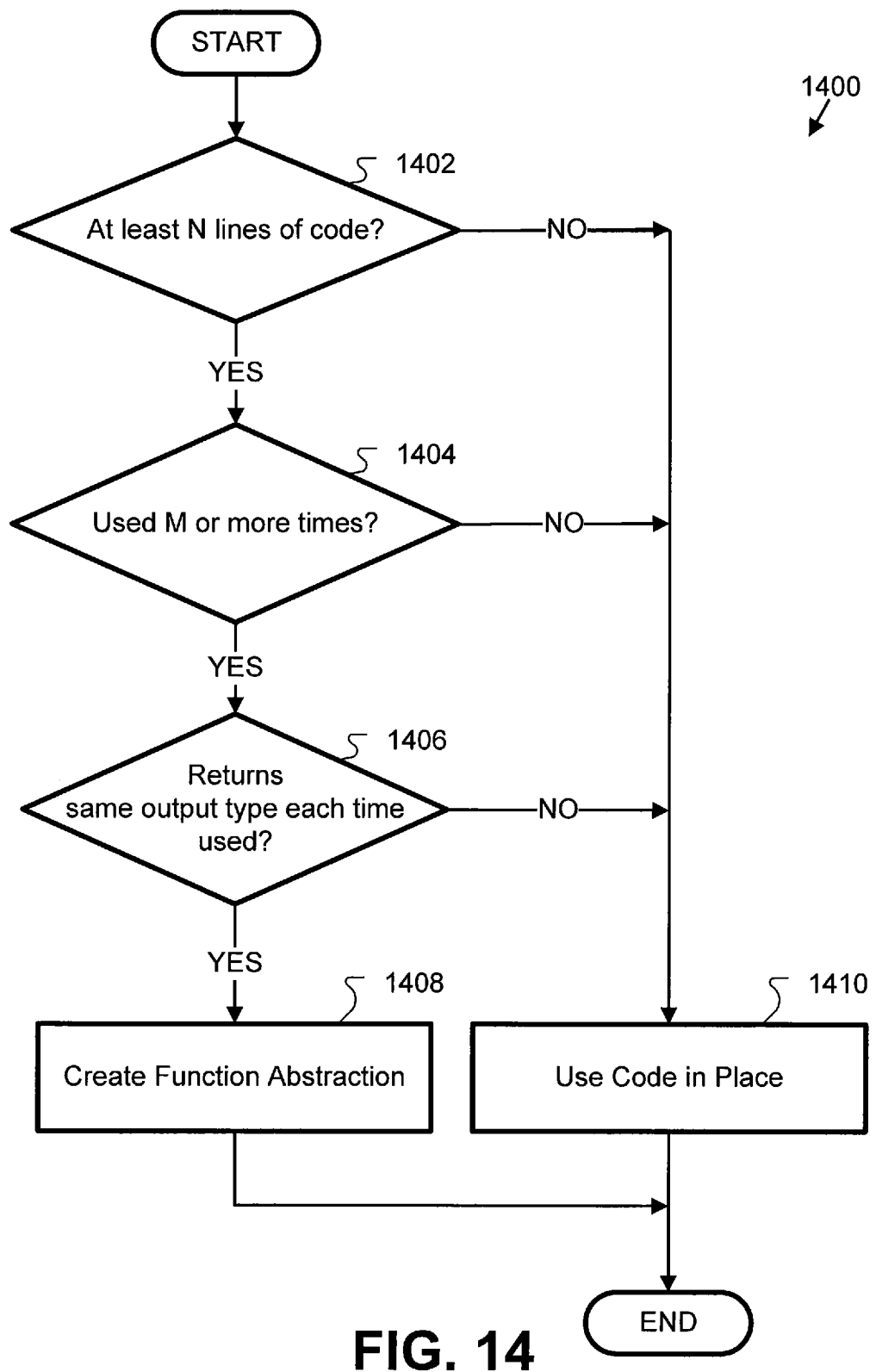
FIG. 14 illustrates an exemplary process flow for creating a function abstraction.

FIG. 14 illustrates an exemplary process flow 1400 for creating a function abstraction.

In decision point 1402, the code refactoring application 125 determines whether a section of similar or identical code is a candidate for function abstraction according to a number of lines heuristic, wherein the section of code must meet or exceed the number of lines defined by the number of lines heuristic. For example, the code refactoring application 125 may determine if the section of similar or identical code is at least N lines long. If the section of code is determined to meet the heuristic, decision point 1404 is executed next. Otherwise, block 1410 is executed next.

In decision point 1404, the code refactoring application 125 determines whether a section of similar or identical code is a candidate for function abstraction according to a number of repetitions heuristic, wherein the section of code must be included at least the number of times defined by the number of repetitions heuristic. For example, the code refactoring application 125 may determine if the section of similar or identical code is used at least M times. If the section of code is determined to meet the heuristic, decision point 1406 is executed next. Otherwise, block 1410 is executed next.

In decision point 1406, the code refactoring application 125 determines whether a section of similar or identical code is a candidate for function abstraction according to an ability of the section of code to be parameterized based on its usage in the combined functions 510. For example, if multiple sections of code perform identical operations on different variables, the multiple sections of code may be combined into a function that takes a particular variable as an input, and that may be called to perform the operations on different variables. As another example, if multiple sections of code return a same output type each time the section of code is used, then the section of code may be a candidate for function abstraction. If the section of code is determined to be able to be parameterized, block 1408 is executed next. Otherwise, block 1410 is executed next.

In block 1408, the code refactoring application 125 creates a function abstraction for the determined lines of code. For example, if a section of code is determined to be a good candidate for function abstraction, then the code refactoring application 125 may create a new function including the corresponding section of code to be abstracted. Each instance of the abstracted section of code may accordingly be replaced by a call to the newly created function, rather than the repetition of the corresponding section of code. In some examples, the new function may be parameterized to be called with one or more parameters, where the parameters may be passed to the abstracted function based on its usage in the combined functions 510. Next, the process 1400 ends.

In block 1410, the code refactoring application 125 uses the code in place. For example, the code refactoring application 125 may leave the section of similar or identical code as-is. Next, the process 1400 ends.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the invention is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising:
a processing device including a processor and a non-transitory memory;
a data store selectively connected to said processing device and configured to store a plurality of segments of a software application, said plurality of segments including code functions configured to produce dynamic content and static markup configured to produce static sections of output; and a code refactoring application included on said non-transitory memory of said processing device, said code refactoring application including instructions that when executed by said processor of said processing device cause said processing device to:
- receive at least a subset of said segments of said software application from said data store;
- determine a design structure for said segments based at least in part on an identification of said code functions configured to produce dynamic content and said static markup configured to produce static sections of output of said received segments; and
- refactor said segments into a refactored segment according to said determined design structure.

2. The system of claim 1, wherein said refactored segment is configured to perform substantially the same operations as said at least a subset of said segments of said software application.

3. The system of claim 1, wherein said code refactoring application includes instructions that when executed further cause said processing device to integrate said refactored segment into said software application in place of said received segments.

4. The system of claim 1, wherein said code refactoring application includes instructions that when executed further cause said processing device to:
- determine at least one markup region associated with at least one of each of said received segments, said association including at least one of said markup portion being included in said received segments and said markup region being included in an output generated by said received segments when executed by a computing device;
- analyze said at least one markup region to determine regions of similarity indicating substantially static markup components of said received segments; and
- create a framework shell from said received segments, wherein said framework shell includes said substantially static markup components of said received segments.

5. The system of claim 4, wherein said code refactoring application includes instructions that when executed further cause said processing device to:
- analyze said at least one markup region to determine regions of difference of said received segments; and
- create a set of dynamic markup components including said determined regions of difference of said received segments.

6. The system of claim 5, wherein said code refactoring application includes instructions that when executed further cause said processing device to:
- create a refactored framework based on said framework shell and said set of dynamic markup components, wherein said refactored framework includes both said identified substantially static markup regions included in said framework shell and a set of conditional expressions that when satisfied selectively include said dynamic regions of difference of said received segments into an output generated by said refactored framework.

7. The system of claim 1, wherein said code refactoring application includes instructions that when executed further cause said processing device to:
- create a set of combined functions from said received segments; and
- refactor said combined functions and said dynamic markup components.

8. The system of claim 7, wherein to refactor said combined functions comprises at least one of variable mapping, loop optimization, and function abstraction.

9. The system of claim 8, wherein said code refactoring application includes instructions that when executed further cause said processing device to perform function abstraction based on at least one of:
- (i) to determine whether a section of similar or identical code is a candidate for function abstraction according to a number of lines heuristic, wherein said section of code meets or exceeds said number of lines defined by said number of lines heuristic,
- (ii) to determine whether said section of code is a candidate for function abstraction according to a number of repetitions heuristic, wherein said section of code is included at least said number of times defined by said number of repetitions heuristic, and
- (iii) to determine whether said section of code is a candidate for function abstraction according to an ability of said section of code to be parameterized based on usage of said section of code in said dynamic functions.

10. A method, comprising:
- receiving at least a subset of segments of a software application from a data store, the received segments including code functions configured to produce dynamic content and static markup configured to produce static sections of output;
- determining, by a code refactoring application, a design structure for a refactored segment based at least in part on an identification of the code functions configured to produce dynamic content and the static markup configured to produce static sections of output of the received segments; and
- refactoring said received segments into said refactored segment according to said determined design structure.

11. The method of claim 10, further comprising requesting the at least a subset of segments of the software application from the data store.

12. The method of claim 10, further comprising configuring the refactored segment to perform substantially the same operations as said at least a subset of the segments of said software application by the refactored segment.

13. The method of claim 10, further comprising integrating the refactored segment into the software application in place of the received segments.

14. The method of claim 10, further comprising:
- determine at least one markup region associated with at least one of each of the received segments, the association including at least one of the markup portion being included in the received segments and the markup region being included in an output generated by the received segments when executed by a computing device;
- analyzing the at least one markup region to determine regions of similarity indicating substantially static markup components of the received segments;
- creating a framework shell from the received segments, wherein the framework shell includes the substantially static markup components of the received segments;
- analyzing the at least one markup region to determine regions of difference of the received segments; and
- creating a set of dynamic markup components including the determined regions of difference of the received segments.

15. The method of claim 14 further comprising:
- creating a refactored framework based on the framework shell and the set of dynamic markup components, wherein the refactored framework includes both the identified substantially static markup regions included in the framework shell and a set of conditional expressions that when satisfied selectively include the dynamic regions of difference of the received segments into an output generated by the refactored framework.

16. The method of claim 10, further comprising:
creating a set of combined functions from the received segments; and
refactoring the combined functions and the dynamic markup components.

17. The method of claim 16, further comprising:
refactoring the combined functions according to at least one of variable mapping, loop optimization, and function abstraction.

18. A non-transitory computer-readable medium tangibly embodying computer-executable instructions comprising:
receiving at least a subset of segments of a software application from a data store, the received segments including code functions configured to produce dynamic content and static markup configured to produce static sections of output;
determining a design structure for a refactored segment based at least in part on an identification of the code functions configured to produce dynamic content and the static markup configured to produce static sections of output of the received segments; and
refactoring said received segments into said refactored segment according to said determined design structure, wherein the refactored segment is configured to perform substantially the same operations as said at least a subset of the segments of said software application by the refactored segment.

19. The computer-readable medium of claim 18 further comprising tangibly embodying computer-executable instructions comprising:
integrating the refactored segment into the software application in place of the received segments.

20. The computer-readable medium of claim 18 further comprising tangibly embodying computer-executable instructions comprising:
determine at least one markup region associated with at least one of each of the received segments, the association including at least one of the markup portion being included in the received segments and the markup region being included in an output generated by the received segments when executed by a computing device;
analyzing the at least one markup region to determine regions of similarity indicating substantially static markup components of the received segments;
creating a framework shell from the received segments, wherein the framework shell includes the substantially static markup components of the received segments;
analyzing the at least one markup region to determine regions of difference of the received segments;
creating a set of dynamic markup components including the determined regions of difference of the received segments; and
creating a refactored framework based on the framework shell and the set of dynamic markup components, wherein the refactored framework includes both the identified substantially static markup regions included in the framework shell and a set of conditional expressions that when satisfied selectively include the dynamic regions of difference of the received segments into an output generated by the refactored framework.

21. The computer-readable medium of claim 18 further comprising tangibly embodying computer-executable instructions comprising:
creating a set of combined functions from the received segments; and
refactoring the combined functions and the dynamic markup components, wherein the refactoring includes at least one of variable mapping, loop optimization, and function abstraction.

22. The system of claim 4, wherein said code refactoring application include instructions that when executed further cause said processing device to:
execute said received segments to determine said output generated by said received segments; and
analyze said output generated by said received segments to determine said regions of similarity indicating substantially static markup components.

23. The method of claim 14, further comprising:
executing the received segments to determine the output generated by the received segments; and
analyzing the output generated by said received segments to determine the regions of similarity indicating substantially static markup components.

24. The computer-readable medium of claim 20 further comprising tangibly embodying computer-executable instructions comprising:
executing the received segments to determine the output generated by the received segments; and
analyzing the output generated by said received segments to determine the regions of similarity indicating substantially static markup components.

* * * * *